(12) United States Patent
Meid

(10) Patent No.: US 10,512,874 B2
(45) Date of Patent: Dec. 24, 2019

(54) METHOD FOR DETERMINING A DEGREE OF LOADING OF A FILTER

(71) Applicant: Deere & Company, Moline, IL (US)

(72) Inventor: Michael Meid, Waghäusel (DE)

(73) Assignee: DEERE & COMPANY, Moline, IL (US)

( * ) Notice: Subject to any disclaimer, the term of this patent is extended or adjusted under 35 U.S.C. 154(b) by 170 days.

(21) Appl. No.: 15/665,601

(22) Filed: Aug. 1, 2017

(65) Prior Publication Data

US 2018/0056223 A1 Mar. 1, 2018

(30) Foreign Application Priority Data

Aug. 24, 2016 (DE) .................. 10 2016 215 909

(51) Int. Cl.
*B01D 35/00* (2006.01)
*B01D 35/143* (2006.01)
(Continued)

(52) U.S. Cl.
CPC ......... *B01D 46/444* (2013.01); *B01D 35/143* (2013.01); *B01D 46/0086* (2013.01); *B01D 46/448* (2013.01); *F01M 1/10* (2013.01); *F01M 11/10* (2013.01); *F16N 39/06* (2013.01); *F01M 11/03* (2013.01); *F01M 2001/1007* (2013.01); *F01M 2250/62* (2013.01);
(Continued)

(58) Field of Classification Search
CPC .... B01D 35/00; B01D 35/005; B01D 35/143; B01D 35/1435; B01D 46/448; B01D 46/0086; F02M 37/22; F02D 33/003; F02D 41/22; F02D 2041/224; F02D 2041/228; F02D 2200/0602; F02D 2200/703; F16N 2260/30; F16N 2250/08; F16N 2250/16; F16N 2250/04; F01N 11/005; F01N 9/002; F01M 2250/62; F01M 2250/66
USPC .......... 55/385.3, DIG. 34; 96/417, 420, 421, 96/422; 123/198 E
See application file for complete search history.

(56) References Cited

U.S. PATENT DOCUMENTS

2004/0217872 A1* 11/2004 Bhardwaj ............ B01D 35/143 340/607
2011/0054811 A1* 3/2011 Contini ................ B01D 35/143 702/47

(Continued)

FOREIGN PATENT DOCUMENTS

DE 199 35 237 B4 2/2001
DE 21 2005 000 024 U1 2/2007

(Continued)

OTHER PUBLICATIONS

European Search Report issued in counterpart application No. 10 2016 215 909.7 dated Jul. 25, 2017 (12 pages).

(Continued)

*Primary Examiner* — Minh Chau T Pham

(57) ABSTRACT

A method for determining a degree of loading on a filter medium of a filter device on a vehicle through which a fluid flows includes determining an operating characteristic of the filter device based on at least one operating quantity of the vehicle and comparing a predefined reference characteristic of the filter device with the operating characteristic. The degree of loading is derived from a result of the comparing step.

17 Claims, 3 Drawing Sheets

(51) Int. Cl.
  *F02M 37/22*  (2019.01)
  *F02D 41/22*  (2006.01)
  *B01D 46/44*  (2006.01)
  *B01D 46/00*  (2006.01)
  *F01M 1/10*  (2006.01)
  *F01M 11/10*  (2006.01)
  *F16N 39/06*  (2006.01)
  *F01N 3/021*  (2006.01)
  *F01N 9/00*  (2006.01)
  *F01N 11/00*  (2006.01)
  *F01M 11/03*  (2006.01)

(52) U.S. Cl.
  CPC ..... *F01M 2250/64* (2013.01); *F01M 2250/66* (2013.01); *F01N 3/0211* (2013.01); *F01N 9/002* (2013.01); *F01N 11/005* (2013.01); *F16N 2250/04* (2013.01); *F16N 2250/06* (2013.01); *F16N 2250/08* (2013.01); *F16N 2250/16* (2013.01); *F16N 2260/02* (2013.01); *F16N 2260/30* (2013.01)

(56) References Cited

U.S. PATENT DOCUMENTS

2016/0206981 A1*  7/2016  Pursifull .............. B01D 35/143
2016/0208726 A1*  7/2016  Tanaka .................. F02M 37/22

FOREIGN PATENT DOCUMENTS

| DE | 10 2007 039 002 A1 | 2/2009 |
| DE | 11 2011 101 982 T5 | 6/2013 |
| DE | 10 2012 201 595 A1 | 8/2013 |
| DE | 10 2013 226 744 A1 | 6/2015 |
| DE | 10 2015 201 295 A1 | 7/2016 |
| DE | 102016100211 A1 | 7/2016 |
| EP | 1473069 A1 | 11/2004 |
| WO | 2015032765 A1 | 3/2015 |

OTHER PUBLICATIONS

European Search Report issued in counterpart application No. 17187299.7 dated Jan. 11, 2018. (8 pages).

* cited by examiner

METHOD FOR DETERMINING A DEGREE OF LOADING OF A FILTER

RELATED APPLICATIONS

This application claims the benefit of German Application Ser. No. 102016215909.7, filed on Aug. 24, 2016, the disclosure of which is hereby expressly incorporated by reference in its entirety.

FIELD OF THE DISCLOSURE

The present disclosure relates to a method for determining a degree of loading of a filter medium of a filter device on a vehicle, where a fluid flows through the medium.

BACKGROUND

Oil filters are used in vehicles of various kinds (for example, in a transmission or a drive motor) to filter out foreign substances in the oil such as contaminants, particles, etc. The foreign substances become deposited as load on the filter medium, so that the filter function becomes adversely affected with increased loading. In order to properly maintain the filter function, it is conventional to replace the oil filter that is in use (or at least its filter medium, through which the liquid flows) at regular time intervals.

SUMMARY

In one embodiment of the present disclosure, a method is provided that enables a determination of the degree of loading of a filter medium of a filter device through which a fluid flows. To determine said degree of loading, an operating characteristic of the filter device (for example, of the filter medium or a filter housing holding the filter medium) is determined in dependence on at least one operating quantity, where in particular the at least one operating quantity is measured during the operation of the vehicle (for example detected, sensed, monitored, or calculated). The determined operating characteristic is compared with a predefined reference characteristic of the filter device (for example, by means of a characteristic map of relevant physical quantities, a reference curve, or reference characteristics from the manufacturer of the filter medium). The current degree of loading is derived or determined from said comparison or comparison result, either directly or after additional processing steps.

The term "degree of loading" is understood to mean a percent quantity from 0 to 100%, where the quantity 100% corresponds to a predefined maximum amount of loading. However, other kinds of information are also conceivable for the "degree of loading," for example as a statement of quantity (for example in grams), or in other physical units. The derivation or determination of the degree of loading therefore enables a statement of how severely the filter medium has already become loaded or what filter capacity of the filter medium can still be available. A signalization to the vehicle operator or a user can take place, for example, via numerical or text data or via a multistep visual signal strip or bar representation.

The determination of the degree of loading enables ongoing information about the current state of loading of the filter medium. The filter medium can therefore be replaced individually and as required. The vehicle operator or a user can then establish the signaled degree of loading (for example, from 0% to 100%) at which the filter medium should be replaced.

In contrast to traditional filter replacements with rigid replacement intervals that are independent of the knowledge of an actual degree of loading, the said determination and signalization of the current degree of loading also enables efficient and cost-savings maintenance of the vehicle with regard to the filter operation.

The vehicle may be an industrial or agricultural utility vehicle, such as a tractor.

The reference characteristic has a reference filter constant or the reference characteristic consists of such a reference filter constant. The reference filter constant can be of various types and, for example, can be taken from the characteristic curve data of the manufacturer of the relevant filter medium under reference conditions or can be derived therefrom. In particular, the reference filter constant represents a predefined upper limit for loading (for example, load amount in grams) under reference conditions, which can be taken from the characteristic curve data of the manufacturer of the relevant filter medium. The reference filter constant $c_{F,ref}$ can, for example, be taken from the equation $$dp_{F,ref} = c_{F,ref} \cdot \Theta_{ref} \cdot Q_{ref}$$

Here these physical quantities mean, under the reference conditions, $dp_{F,ref}$ is a pressure loss of the filter medium, $\eta_{ref}$ is a dynamic viscosity of the fluid, and $Q_{ref}$ is a volume flow of the fluid through the filter medium.

The reference filter constant can be compared with an operating filter constant determined during the vehicle operation in order to derive a current degree of loading. An operating filter constant $c_F$ is determined on the basis of the above equation by determining or calculating a pressure loss $dp_F$ of the filter medium, a dynamic viscosity $\eta(T)$ of the fluid that exists at the said pressure loss $dp_F$ in dependence on the fluid temperature T, and a volume flow Q of the fluid through the filter medium that is present at the said pressure loss $dp_F$, during the vehicle operation.

A simple determination of the degree of loading can be based on the consideration that the gradient $c_F \cdot \eta(T)$ is dependent on the filter load and increases with increasing filter load. For example, a ratio $c_F/c_{F,ref}$ can be created in order to derive a current degree of loading, where the reference filter constant $c_{F,ref}$ represents the predefined upper limit of the load and thus corresponds to a predefined degree of loading of 100%.

In another embodiment, the reference characteristic has a pressure loss $dp_{F,ref}$ representing the filter medium in dependence on a load (for example, load amount in grams), or the reference characteristic consists of such a physical relationship. This pressure loss $dp_{F,ref}$ as a function of the load is made available as characteristic curve data from the manufacturer of the relevant filter medium. This function can then be compared with a pressure loss $dp_F$ of the filter medium determined during the vehicle operation as operating characteristic, in order to derive the current degree of loading of the filter medium from the said comparison.

The operating characteristic is determined in dependence on at least one of the following operating parameters:
 a temperature T of the fluid,
 a rotary speed n of a drive motor of the vehicle.
 Through this the operating characteristic can be determined with a small number of operating quantities, or operating parameters. Advantageously, these operating parameters are already standardly available on the vehicle as data for other purposes anyway, so that the cost for determination of the operating characteristic remains low and, in particular, no additional sensors, detectors, or the like are even necessary.

In addition, the operating characteristic is determined in dependence on at least one of the following operating quantities:
a temperature-dependent density $\rho(T)$ of the fluid,
a temperature-dependent viscosity $\eta(T)$ of the fluid,
a volume flow $Q(n, T)$ of the fluid that is independent of the rotary speed n of the drive motor of the vehicle and/or the temperature T of the fluid.

These operating quantities, or operating parameters, can be determined particularly easily when the temperature T of the fluid and the rotary speed n of the drive motor are standardly available anyway. Advantageously, specific physical equations or characteristic maps, which contain the temperature T of the fluid or the rotary speed n of the drive motor as variable or variables, can be employed to determine the said density, viscosity, and the volume flow.

Advantageously, the filter medium is placed or inserted into a filter housing of the filter device, where the filter device has a filter inlet and a filter outlet. The desired operating characteristic can then be determined in dependence on at least one of the following operating quantities:
a pressure loss of the filter housing,
a pressure loss of the filter device between the filter inlet and the filter outlet.

These pressure losses can be determined, for example, by means of physical equations or by means of a differential pressure measurement. A simple determination of the pressure loss at the filter medium can be based on the fact that pressure loss of the filter device between the filter inlet and filter outlet corresponds approximately to the sum of the pressure losses of the filter housing and the filter medium. The pressure loss of the filter housing is determined by calculation and the pressure loss of the filter device is determined by a differential pressure determination. Then the pressure loss $dp_F$ of the filter medium can be determined by the above relationship and an operating filter constant $c_F$ can be derived therefrom.

The differential pressure determination of the filter device takes place, for example, via a differential pressure sensor, a differential pressure switch, a control valve with a pressure switch, two pressure sensors (a sensor at the filter inlet and a sensor at the filter outlet), or by a pressure sensor or pressure switch at the filter inlet, provided a constant pressure can be expected at the filter outlet.

If one or more pressure sensors or a differential pressure sensor is used, the pressure loss or differential pressure between the filter inlet and filter outlet can be determined at any point of operation. This enables continuous determination of the operating characteristic and correspondingly continuous determination of the current degree of loading during vehicle operation.

In a further embodiment, the pressure loss of the filter device between the filter inlet and filter outlet corresponds to the differential pressure of a differential pressure switch at its switching point. The differential pressure at the switching point is already known in this case or is defined by its technical dimensioning for any differential pressure switch that is used. To determine the operating characteristic, then at least one operating quantity or operating parameter with its values at the time point of the said switching point is used. Thus, with simple technical means, the operating conditions at the switching point of the differential pressure switch are used for an accurate determination of the degree of loading. Here the functionality of the differential pressure switch is utilized, whereupon, away from its switching point, two different switching states are present, namely a first switching state (with smaller or larger differential pressure than at the switching point) and a second switching state (with larger or smaller differential pressure than at the switching point).

The differential pressure switch, before the determination of the operating characteristic, has one of the two said switching states. Advantageously, the switching point of the differential pressure switch is then reached in a technically simple way by using a changing (increasing or decreasing) rotary speed of a drive motor of the vehicle (for example, upon acceleration or deceleration of the vehicle) to switch the differential pressure switch from the first switching state to the second switching state. Therefore, one need only detect, in a technically simple way, the switching point in order to determine the operating characteristic by means of the operating quantities or operating parameters that are relevant at the time point of the switching point.

Additional process steps can be provided in order to support a reliable technical course of the method. In particular, before the change of the rotary speed of the drive motor, a detection is made to see if the differential pressure switch already exhibits the required switching state (target switching state). If this is not the case (i.e., the differential pressure switch is beyond the switching point in a switching state different from the required target switching state), initially at least one operating quantity or operating parameter is changed (for example, an increase of the temperature of the fluid), or a wait is triggered for a change of the said at least one operating quantity or the at least one operating parameter, at least until the required target switching state of the differential pressure switch is established. Then a changing rotary speed (increase or decrease of the rotary speed) of the drive motor can be employed to carry out the method.

The fluid may be an oil or is made as an oil-containing fluid. Correspondingly, the method can be used to determine the degree of loading of various filter devices on the vehicle, for example, transmission oil filter, main hydraulic filter, or engine filter.

In yet a further embodiment, the data representing the degree of loading can be sent to a receiving unit that is external to the vehicle (for example, at the vehicle manufacturer). In this way, the data can contribute to analyzing the filter media and filter housing used in the vehicle more precisely and to support a more exact dimensioning of the filter device, in particular, the filter medium or the filter housing.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
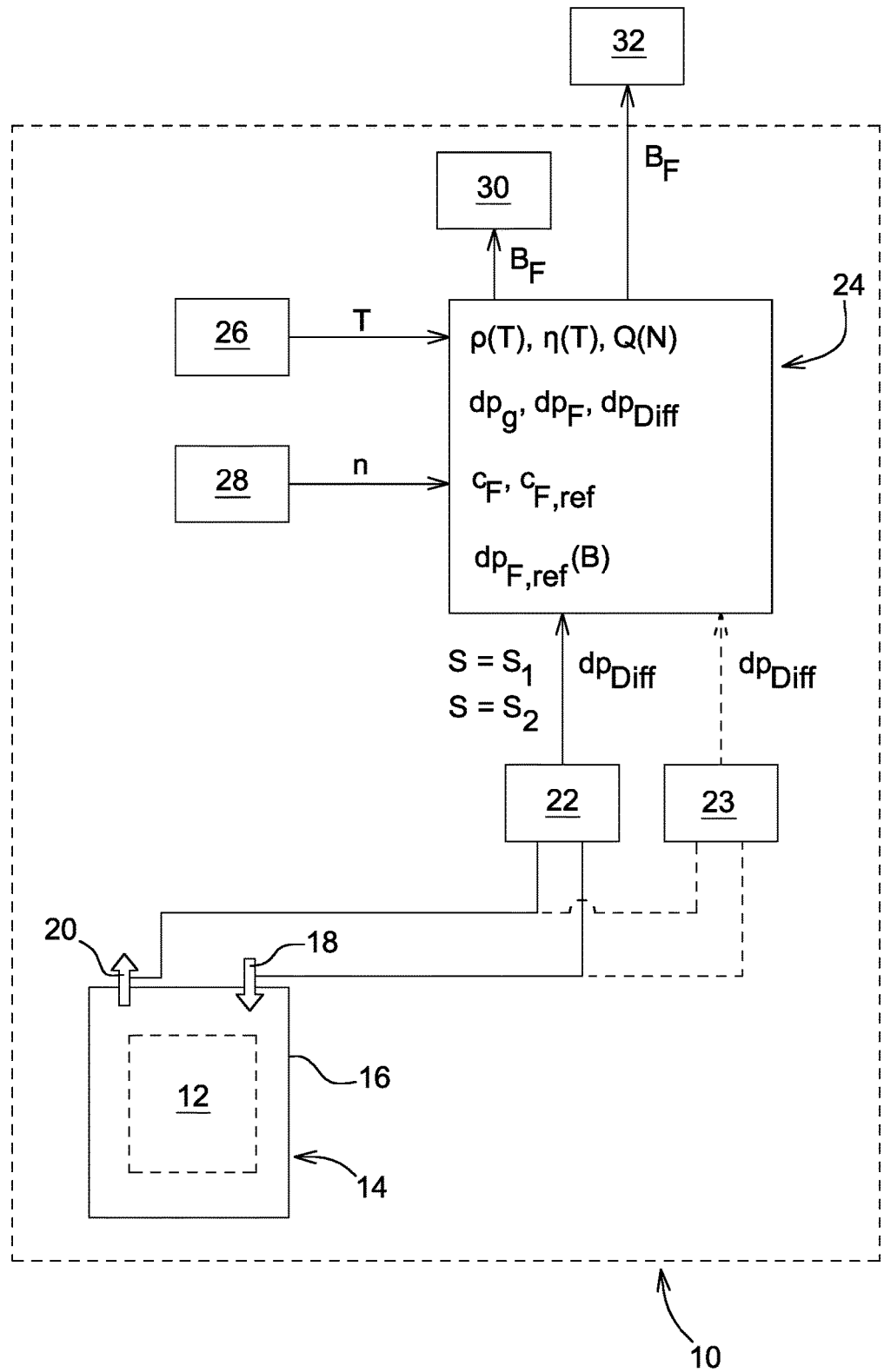
FIG. 1 shows a block circuit diagram with schematic representation of means for determination of the current degree of loading of a filter medium on a vehicle.

FIG. 1 schematically shows a utility vehicle 10 such as an agricultural vehicle (for example, a tractor), with means for determining a current degree of loading $B_F$ of a filter medium 12 of a filter device 14, which is disposed on utility vehicle 10 and through which a fluid, in particular an oil, flows. The filter device 14 has a filter inlet 18 and a filter outlet 20 on its filter housing 16.

A differential pressure switch 22 for detection of a differential pressure $dp_{Diff}$ is connected between the filter inlet 18 and the filter outlet 20 on the filter device 14. The differential pressure switch 22 can assume, away from its switching point, two different switching states, for example, a first switching state (e.g., with the switch electrically closed) and a second switching state (e.g., with the switch electrically open). The first switching state corresponds to a status signal $S_1$, while the second switching state corresponds to a status symbol $S_2$. These status signals are registered by a data processing unit 24.

Figure 2:
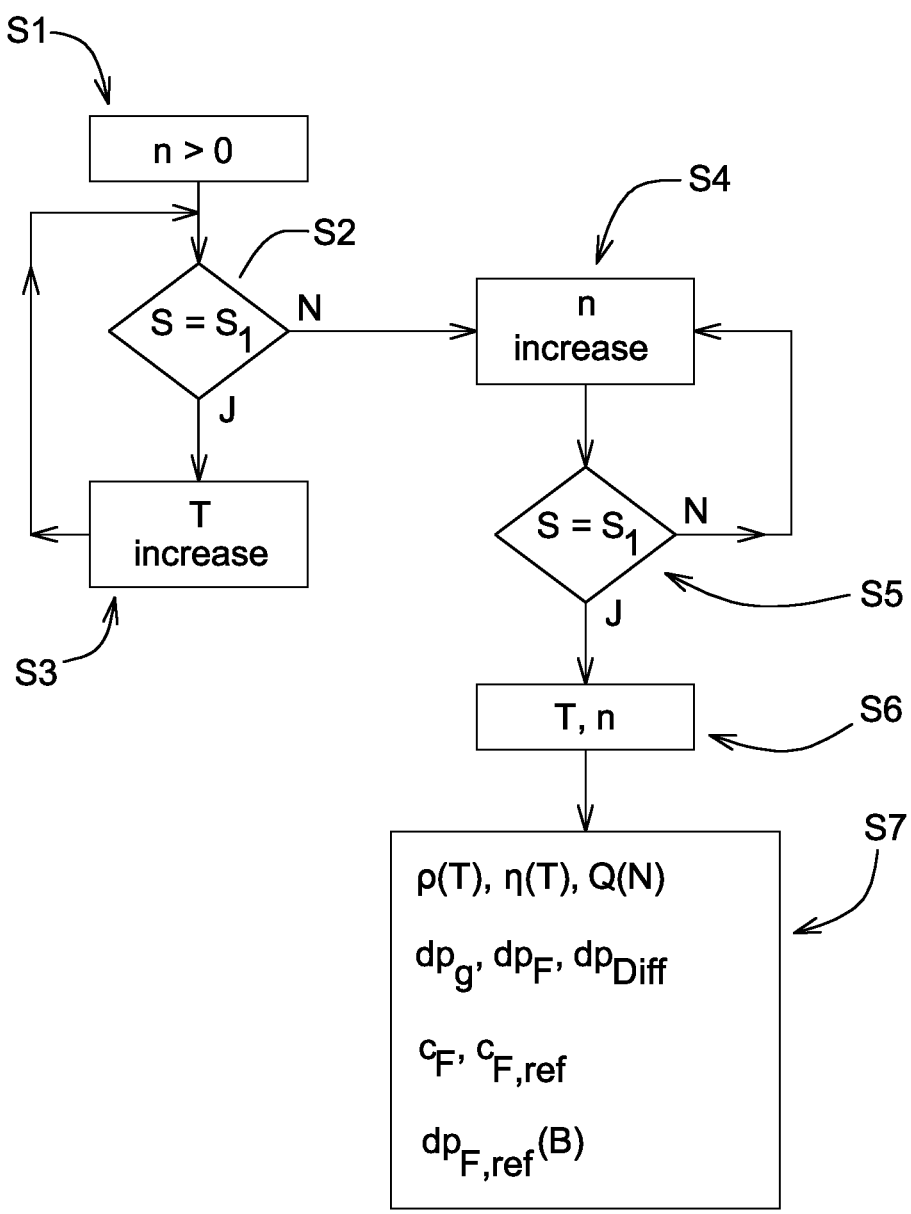
FIG. 2 shows a flow diagram with representation of the steps of the method for determination of the current degree of loading of the filter medium.

In the embodiment shown in FIG. 2, the differential pressure $dp_{Diff}$, which is present at the time point of switching (switching point) of the differential pressure switch 22 from the second switching state $S_2$ to the first switching state $S_1$, is relevant for the determination of a current degree of loading $B_F$ of the filter medium 12. It is advantageous when using the differential pressure switch 22 or, alternatively, a valve with a pressure switch, that the switching take place at a pre-established pressure difference, thus, the differential pressure $dp_{Diff}$ at the time of switching is known.

The temperature T of the fluid and the rotary speed n of a drive motor of the utility vehicle 10 during the vehicle operation are detected or monitored as operating quantities of the utility vehicle 10. For this a temperature sensor 26 and a rotary speed sensor 28 are present on utility vehicle 10. The signals of these sensors 26 and 28 are received by the data processing unit 24.

The signals of the sensors 26, 28 and the status signals $S_A$, $S_{NA}$ and, optionally, the differential pressure $dp_{Diff}$ are processed in the data processing unit 24. In addition, the data processing unit 24 determines additional operating quantities or operating parameters such as, for example, a density $\rho(T)$ of the fluid that is dependent on the fluid temperature T, a dynamic viscosity $\eta(T)$ of the fluid that is dependent on the fluid temperature T, a volume flow $Q(n, T)$ of the fluid that is dependent on the rotary speed n of the drive motor of the utility vehicle 10 and on the fluid temperature T, a pressure loss $dp_G$ of the filter housing 16, a pressure loss $dp_F$ of the filter medium 12, an operating filter constant $c_F$, and a reference filter constant, $c_{F,ref}$. The degree of loading $B_F$ of the filter medium 12 is derived from these data and, optionally, additional data. The degree of loading $B_F$ is put into signal form in the utility vehicle 10 by means of a visual or acoustic display unit 30. The degree of loading $B_F$ is indicated, for example, as a percent indication of 0%-100%, as an indication of amount (for example in grams), or as a multistep visual bar representation. Through this, the vehicle operator or another user of the utility vehicle 10 can be regularly informed about the current degree of loading $B_F$.

The degree of loading $B_F$ can also be transmitted from the data processing unit 24 to an external receiving unit 32, which is present outside of the utility vehicle 10, for example, at the vehicle manufacturer. The transmission and external evaluation of the degree of loading $B_F$ or even some of the other said data can contribute to dimensioning the filter device 14 or its individual components more accurately.

In accordance with FIG. 2, the start of the method takes place with the drive motor running, i.e., at a rotary speed n>0 (step S1).

In step S2 of the method, a test is made to see if the differential pressure switch 22 is in a state that deviates from the target state, i.e., if status S corresponds to the status signal $S_1$. If this is the case (i.e., the differential pressure switch 22 is not in the target state), initially the fluid temperature T is increased during vehicle operation (step S3) until the differential pressure switch 22 enters its target state, i.e., the status S corresponds to the status signal $S_2$. In this state an increase of the rotary speed n of the drive motor, for example, upon an acceleration of the utility vehicle 10 (step S4), causes, at a specific rotary speed level, the switching point of the differential pressure switch 22 to be detected, at which it again takes on a state with the status $S=S_1$ (step S5). The values of the rotary speed n and the fluid temperature T at the time of the switching point are registered (step S6) and processed in the data processing unit 24 in order to determine an operating characteristic (step S7) and to compare said characteristic with a predefined reference characteristic, in order to derive a current degree of loading $B_F$ from the comparison result.

As an alternative to the said increase of the rotary speed n, in step S4 it is also possible to use a reduction of the rotary speed n to detect a switching point of the differential pressure switch 22.

When carrying out the method in step S4, a change of the rotary speed n during the ordinary working operation of the utility vehicle 10 is used, so that no separate process steps are necessary for the required change of rotary speed.

As an alternative to the differential pressure switch 22, a differential pressure sensor 23 or two pressure sensors can be used, as indicated in FIG. 1 by the dashed lines. In this case a change of the rotary speed n during the process sequence is not necessary. Rather, the current differential pressure $dp_{Diff}$ is continuously available by means of the differential pressure sensor 23 or the pressure sensors, so that the operating characteristic and, from it, the current degree of loading $B_F$ can be determined at different, or any, operating points of the differential pressure sensor 23 or the pressure sensors.

To determine a suitable operating characteristic, one can proceed from the following relationships:

The differential pressure $dp_{Diff}$ of the differential pressure switch 22 is approximately the sum of the pressure loss $dp_F$ of the filter medium 12 and the pressure loss $dp_G$ of the filter housing 16 according to $$dp_{Diff} = dp_F + dp_G \quad (1).$$

The pressure loss of the filter housing $dp_G$ during flow through the filter housing 16 can approximately be considered to be the sum of a turbulent flow share $c_{turb} \cdot \rho(T) \cdot Q^2$ and a laminar flow share $c_{lam} \cdot \eta(T) \cdot Q$, according to $$dg_s(\rho, \eta, Q) = c_{turb} \cdot \rho(T) \cdot Q^2 + c_{lam} \cdot \eta(T) \cdot Q \quad (2),$$

where $c_{turb}$ and $c_{lam}$ are specific constants for the filter housing 16 and Q is the volume flow (for example in liters/minutes) of the fluid.

The pressure loss $dp_F$ of the filter medium 12 can be described by a linear relationship between the volume flow Q and the pressure loss $dp_F$ according to $$dp_F(\eta, Q) = c_F \cdot \eta(T) \cdot Q \quad (3).$$

Solving equation (3) with the operating filter constant $c_F$ and taking into account equation (1) gives $$c_F = 1/\eta(T) \cdot 1/Q \cdot (dp_{Diff} - dp_G) \quad (4).$$

For the temperature-dependent density ρ(T) of the fluid, one can assume a linear relationship according to $$\rho(T) = \rho(15° C.) - a \cdot (T - 15° C.) \quad (5)$$

where the fluid density ρ (15° C.) at 15° C. and the correction value a can be taken from characteristic maps or tables. The temperature-dependent fluid density ρ(T) can be determined in this way.

A linear relationship can be assumed for the temperature-dependent dynamic viscosity η(T) of the fluid according to $$\eta(T) = \rho(T) \cdot v(T) \quad (6),$$

where v(T) is a kinematic viscosity of the fluid that is dependent on the fluid temperature and is known for the relevant fluid from the corresponding characteristic map or table values or even taking into account the Ubbelohde equation.

The current volume flow Q or Q(n, T) of the fluid in dependence on the rotary speed of the engine n and the fluid temperature T can likewise be taken from a characteristic map or the like. For example, an efficiency map (volumetric efficiency) of the relevant fluid pump at the existing back pressure of the fluid pump can be created in dependence on the fluid temperature T and the engine speed n. In the case of a highly varying back pressure and a pronounced dependence of the volumetric efficiency on the back pressure of the fluid pump, the use of the said sensors or the differential pressure sensor 23 instead of the differential pressure switch 22 is advantageous in order to improve the accuracy in the determination of the degree of loading $B_F$.

Thus, all of the operating quantities or operating parameters in the above equations can be determined if the processing unit 24 receives and appropriately processes the registered or monitored fluid temperature T and engine speed n and the differential pressure $dp_{Diff}$ at the switching point of the differential pressure switch 22.

Figure 3:
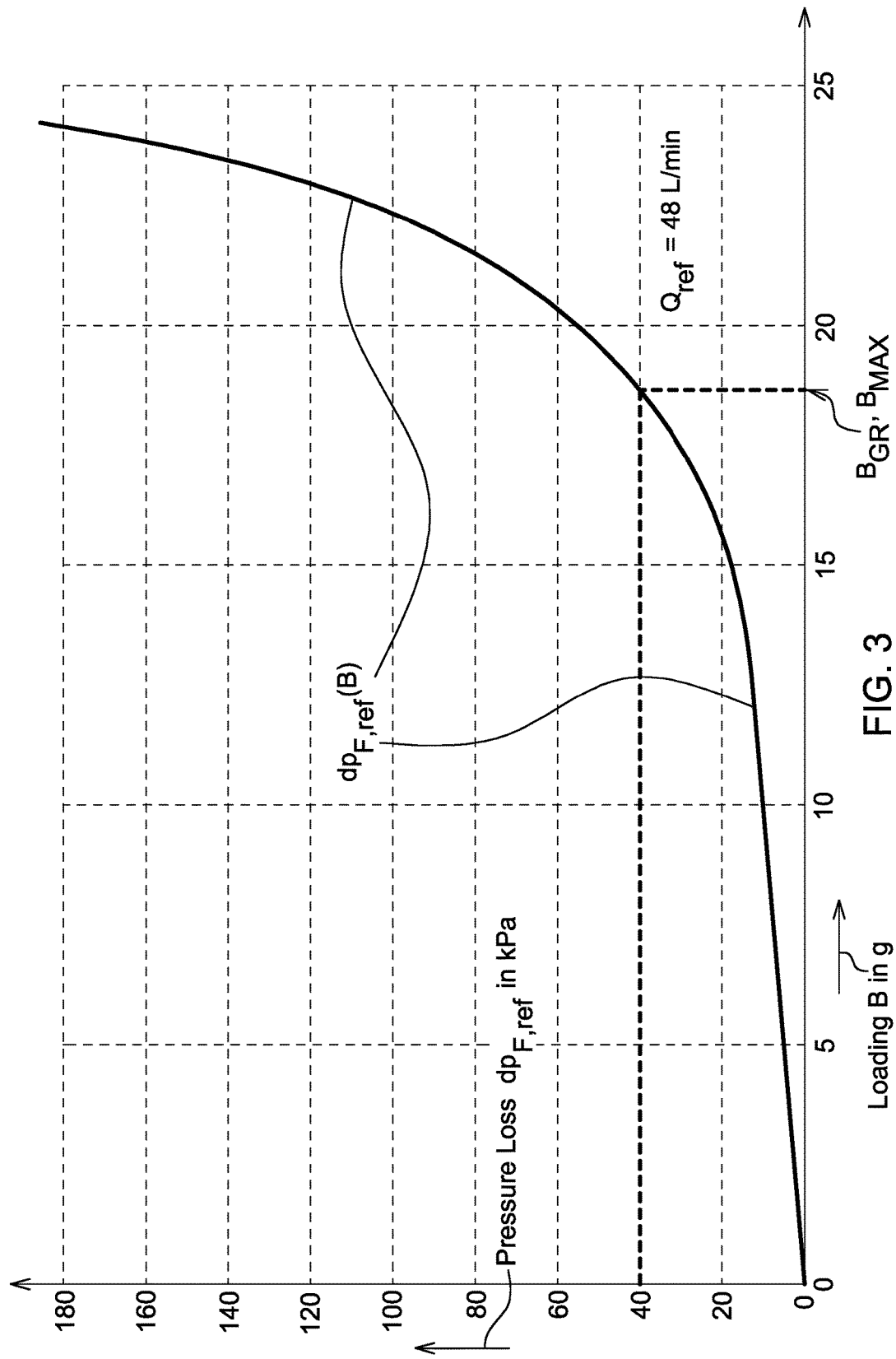
FIG. 3 shows a reference curve for representation of the pressure loss of a filter medium in dependence on loading.

From that the operating filter constant $c_F$ can be determined as an operating characteristic according to equation (4). The operating filter constant $c_F$ can be compared with a predefined reference filter constant $c_{F,ref}$ as reference characteristic. A current percent degree of loading $B_F$ of the filter medium 12 can be derived from the ratio $c_F/c_{F,ref}$. Here the reference filter constant $c_{F,ref}$ can be determined, for example, by analogy with equation (3) as $$c_{F,ref} = dp_{F,ref}/(\eta_{ref} \cdot Q_{ref}) \quad (7)$$

where $dp_{F,ref}$ is a predefined pressure loss of the filter medium 12 at a predefined load limit $B_{GR}$ (corresponds to a predefined degree of loading of 100%) at a predefined volume flow $Q_{ref}$ (for example 48 L/min) and at a predefined dynamic viscosity $\eta_{ref}$. These values can be established, for example, by the filter manufacturer as standard values or the corresponding data can be taken from characteristic curves or tables (FIG. 3). The load limit or the load limit value $B_{GR}$ can therefore be predefined under the preset reference conditions.

In another embodiment, a preset characteristic curve or function of the filter medium 12, can serve as reference characteristic, which gives a pressure loss $dp_{F,ref}$ of the filter medium 12 in dependence on the load B (for example amount in grams). This reference characteristic can then be compared with a pressure loss $dp_F$ of the filter medium 12 that is determined during vehicle operation as operating characteristic in order to determine a current load amount. The current load amount can, as an operating characteristic, be compared, for example, with a predefined maximum load amount $B_{MAX}$ as reference characteristic to derive a current percent degree of loading $B_F$ of the filter medium 12 from the ratio of the two values.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for determining a degree of loading on a filter medium of a filter device on a vehicle through which a fluid flows, the method comprising:
    positioning the filter medium in a filter housing of the filter device with a filter inlet and a filter outlet;
    determining a pressure loss of the filter device between the filter inlet and the filter outlet via a differential pressure of a differential pressure switch at its switching point between a first switching state and a second switching state;
    detecting the switching state of the differential pressure switch before changing the rotary speed of the drive motor;
    if the differential pressure switch is in the first switching state, increasing a temperature of the fluid at least until the differential pressure switch switches to the second switching state;
    if the differential pressure switch is in the second switching state, changing a rotary speed of a drive motor of the vehicle at least until the differential pressure switch switches to the first switching state;
    determining an operating characteristic of the filter device based on at least the pressure loss of the filter device between the filter inlet and the filter outlet during the switching point of the differential pressure switch from the second switching state to the first switching state;
    comparing a predefined reference characteristic of the filter device with the operating characteristic; and
    deriving the degree of loading from a result of the comparing step.

2. The method of claim 1, further comprising providing the reference characteristic with a reference filter constant at a predefined limit value of the loading, or providing the operating characteristic with an operating filter constant representing an operating state of the filter medium.

3. The method of claim 1, further comprising providing the reference characteristic with a pressure loss representing the filter medium based on a load, or determining the operating characteristic having a pressure loss of the filter medium during the vehicle operation.

4. The method of claim 1, further comprising determining the operating characteristic based on at least one of a temperature of the fluid and a rotary speed of a drive motor of the vehicle.

5. The method of claim 4, further comprising determining the operating characteristic based on at least one of a temperature-dependent density of the fluid, a temperature-dependent viscosity of the fluid, and a volume flow of the fluid that is dependent on the rotary speed of the drive motor of the vehicle or the temperature of the fluid.

6. The method of claim 1, wherein the fluid comprises an oil.

7. The method of claim 1, further comprising transmitting data representing the degree of loading to a receiving unit located external to the vehicle.

8. The method of claim 1, further comprising providing the reference characteristic with a reference filter constant at a predefined limit value of the loading.

9. The method of claim 1, further comprising providing the operating characteristic with an operating filter constant representing an operating state of the filter medium.

10. The method of claim 1, further comprising providing the reference characteristic with a pressure loss representing the filter medium based on a load.

11. The method of claim 1, further comprising determining the operating characteristic having a pressure loss of the filter medium during the vehicle operation.

12. The method of claim 1, further comprising determining the operating characteristic based on at least a temperature of the fluid.

13. The method of claim 1, further comprising determining the operating characteristic based on at least a rotary speed of a drive motor of the vehicle.

14. The method of claim 1, further comprising determining the operating characteristic based on at least a temperature of the fluid, a rotary speed of a drive motor of the vehicle, a temperature-dependent density of the fluid, a temperature-dependent viscosity of the fluid, and a volume flow of the fluid that is dependent on the rotary speed of the drive motor of the vehicle or the temperature of the fluid.

15. The method of claim 1, wherein the predefined reference characteristic is determined by the pressure loss of the filter medium divided by the product of the dynamic viscosity of the fluid and the volume flow of the fluid through the filter medium, expressed by the equation $c_{F,ref}=dp_{F,ref}/(\eta_{ref} \cdot Q_{ref})$.

16. The method of claim 1, wherein the operating characteristic is determined by the inverse of the temperature-dependent dynamic viscosity times the inverse of the volume flow of the fluid times the difference of the differential pressure of the differential pressure switch and the pressure loss of the filter housing, expressed by the equation $c_F=1/\eta(T) \cdot 1/Q \cdot (dp_{Diff}-dp_G)$.

17. The method of claim 1, wherein the degree of loading is a ratio of the operating characteristic to the predefined reference characteristic, expressed by the equation $B_F=C_F/C_{F,ref}$.

* * * * *